US008134493B2

(12) United States Patent
Noble et al.

(10) Patent No.: US 8,134,493 B2
(45) Date of Patent: Mar. 13, 2012

(54) SYSTEM AND METHOD FOR PRECISION GEOLOCATION UTILIZING MULTIPLE SENSING MODALITIES

(75) Inventors: William B. Noble, Santa Monica, CA (US); Duncan L. Crawford, Richardson, TX (US); Jeffrey M. Guild, Torrance, CA (US)

(73) Assignee: Raytheon Company, Waltham, MA (US)

( * ) Notice: Subject to any disclaimer, the term of this patent is extended or adjusted under 35 U.S.C. 154(b) by 377 days.

(21) Appl. No.: 12/497,492

(22) Filed: Jul. 2, 2009

(65) Prior Publication Data

US 2011/0001658 A1     Jan. 6, 2011

(51) Int. Cl.
 *G01S 13/42* (2006.01)
(52) U.S. Cl. ............ 342/107; 342/59; 342/96; 342/125; 342/126; 342/133; 342/140; 342/146; 342/160; 342/161
(58) Field of Classification Search .......... 342/107–113, 342/115, 59, 95–97, 125, 126, 133, 139–141, 342/146, 147, 417, 444, 450, 451, 461, 463, 342/159–162
See application file for complete search history.

(56) References Cited

U.S. PATENT DOCUMENTS

| | | | |
|---|---|---|---|
| 3,196,439 A | 7/1965 | Byatt | |
| 4,058,809 A * | 11/1977 | Chudleigh, Jr. | 342/92 |
| 4,153,899 A * | 5/1979 | Taylor, Jr. | 342/162 |
| 4,217,583 A | 8/1980 | Hiller et al. | |
| 4,481,519 A | 11/1984 | Margerum | |
| 4,888,593 A | 12/1989 | Friedman et al. | |
| 5,164,910 A * | 11/1992 | Lawson et al. | 235/411 |
| 5,570,099 A | 10/1996 | DesJardins | |
| 5,999,129 A * | 12/1999 | Rose | 342/394 |
| 6,018,312 A * | 1/2000 | Haworth | 342/353 |
| 6,407,703 B1 * | 6/2002 | Minter et al. | 342/450 |
| 6,577,272 B1 * | 6/2003 | Madden | 342/387 |
| 6,646,602 B2 | 11/2003 | Krikorian et al. | |
| 6,876,859 B2 | 4/2005 | Anderson et al. | |
| 7,453,400 B2 * | 11/2008 | Struckman et al. | 342/465 |
| 7,561,105 B2 * | 7/2009 | Murphy et al. | 342/465 |
| 7,616,155 B2 * | 11/2009 | Bull et al. | 342/387 |

(Continued)

OTHER PUBLICATIONS

Stein, Seymour. "Algorithms for Ambiguity Function Processing." IEEE Transactions on Acoustics, Speech, and Signal Processing, vol. ASSP-29, No. 3, Jun. 1981 (588-599).

(Continued)

*Primary Examiner* — John Sotomayor
(74) *Attorney, Agent, or Firm* — Christie, Parker & Hale, LLP

(57) ABSTRACT

A system and method for determining the geolocation of a signal emitter moving at an unknown velocity by combining signal data of a target detection platform (e.g., a radar system) and signal data collected by two or more moving signal collection platforms (e.g., RF signal receivers). In one embodiment, the target detection platform determines tentative location and velocity of the signal emitter, and the signal collection platforms are configured to perform TDOA and/or FDOA analysis of the collected signal data corresponding to a signal of the signal emitter. In one embodiment, solutions provided from the TDOA and/or FDOA analysis are unbiased by using the tentative velocity of the signal emitter, and the geolocation of the signal emitter is determined by matching the TDOA/FDOA solutions and the detected tentative location.

11 Claims, 4 Drawing Sheets

U.S. PATENT DOCUMENTS

| | | | |
|---|---|---|---|
| 7,626,546 B2* | 12/2009 | Chung et al. | 342/465 |
| 7,663,547 B2* | 2/2010 | Ho et al. | 342/387 |
| 2004/0027276 A1* | 2/2004 | Herman | 342/181 |
| 2006/0227042 A1* | 10/2006 | Budic | 342/195 |
| 2007/0120738 A1* | 5/2007 | Stroud | 342/387 |
| 2011/0001658 A1* | 1/2011 | Noble et al. | 342/107 |

OTHER PUBLICATIONS

Bucher, Ralph and Misra, D. "A Synthesizable VHDL Model of the Exact Solution for Three-dimensional Hyperbolic Positioning System." VLSI Design, 2002 vol. 15 (2), pp. 507-520.

* cited by examiner

SYSTEM AND METHOD FOR PRECISION GEOLOCATION UTILIZING MULTIPLE SENSING MODALITIES

BACKGROUND OR THE INVENTION

The present invention generally relates to radio frequency signal emitter geolocation systems and, more particularly, to a system combining multiple sensor modalities to improve the accuracy of using time difference of arrival (TDOA) and/or frequency difference of arrival (FDOA) techniques to determine the geolocation of a signal emitter.

The ability to determine the geolocation of a signal emitter (e.g., a mobile phone, a walkie-talkie, etc.) has many applications such as search/rescue operations, police/border protection, maritime patrol/rescue and military actions. TDOA and FDOA are known methods for using radio frequency (RF) signals measured at two or more separated receivers to determine the geolocation of a radio frequency signal emitter (hereinafter "signal emitter"). TDOA locates the signal emitter by exploiting the difference in the path length or range difference between the signal emitter and each of the receivers and the corresponding propagation time difference between the signal emitter and the receivers. FDOA estimates the location of the signal emitter based on the frequency difference observations from the receivers. It differs from TDOA in that the receivers must be in relative motion with respect to each other and the signal emitter. This relative motion results in different Doppler shift observations of the signal emitter at each of the receivers. When the locations and vector velocities of the receivers are known, the geolocation of the signal emitter can be estimated using the observed relative Doppler shifts between pairs of the receivers.

TDOA and FDOA are sometimes used together to improve location accuracy, and the resulting estimates are independent to an extent. When the signal emitter is stationary relative to the receivers, currently known TDOA/FDOA techniques can reliably determine the geolocation of the signal emitter. However, when the signal emitter is not stationary, currently known TDOA/FDOA location algorithms or techniques are very sensitive to signal emitter velocity induced errors. Therefore, determining the geolocation of a moving signal emitter by using currently known TDOA/FDOA techniques alone is less than satisfactory. Numerous attempts have been made to improve the accuracy of known TDOA/FDOA techniques in locating a moving signal emitter. However, there appear to be no currently known TDOA/FDOA techniques that can adequately handle the problem caused by a non-stationary signal emitter.

Therefore, it is desirable to develop a system and method that can accurately and reliably determine the geolocation of a non-stationary signal emitter. Furthermore, it is desirable to provide a system and method that can improve the accuracy of TDOA/FDOA techniques for determining the geolocation of a non-stationary signal emitter.

SUMMARY OF THE INVENTION

Embodiments of the present invention provide a system and method for determining the geolocation of a signal emitter moving at an unknown velocity by detecting at least one tentative velocity and at least one tentative location of the signal emitter to unbias the TDOA/FDOA solutions to improve the accuracy of the TDOA/FDOA techniques. The tentative velocity and location of the signal emitter may be detected by various methods such as radar, sonar, visible light or infrared/hyper spectral images (such as television, or FLIR) and laser/LADAR.

Embodiments of the present invention combine multiple sensor modalities to improve TDOA/FDOA accuracy for locating the geolocation of a non-stationary signal emitter. Also, embodiments of the present invention use the tentative velocity and location of the signal emitter as hypotheses to remove target velocity biases from TDOA/FDOA geolocation solutions of the moving signal emitter.

In some embodiments, two or more moving signal collection platforms for collecting signal data of a signal emitter may be airplanes which are suitably equipped to receive the signal emitted from the signal emitter. A target detection platform is provided to collect data from the signal emitter. The data collected by the target detection platform includes tentative velocity and location of the signal emitter. The moving signal collection platforms are suitably configured to exchange information on their respective detected signal data. Further, the signal collection platforms may be configured to perform FDOA and/or TDOA geolocation techniques on the collected signal data. In some embodiments of the present invention, the target detection platform and one of the signal collection platforms may be the same platform or may be implemented on different platforms. In some embodiments, some of the two or more signal collection platforms may be stationary.

According to an embodiment of the present invention, a system for locating a signal emitter is provided. The system includes at least two signal collection platforms spaced apart from each other for receiving a signal from a signal emitter and forming line-of-bearings of the signal emitter. At least one target detection platform is included in the system for detecting a tentative velocity and a tentative location of the signal emitter. Further, the system includes a processor for determining the geolocation of the signal emitter by utilizing the signal received by the at least two signal collection platforms, the tentative location and the tentative velocity of the signal emitter.

In an aspect of the embodiment, the at least two signal collection platforms may be configured to have a non-zero relative velocity.

In an aspect of the embodiment, the processor may be configured to define a search area corresponding to the intersection of the line-of-bearings, and the at least one target detection platform may be configured to search for the signal emitter in an area substantially overlapping the search area.

In an aspect of the embodiment, the at least two signal collection platforms may be configured to provide signal data to the processor for performing TDOA and/or FDOA techniques to generate solutions for the geolocation of the signal emitter.

In an aspect of the embodiment, the processor may be configured to utilize the tentative velocity of the signal emitter to reduce a bias in the solutions of the geolocation of the signal emitter.

In an aspect of the embodiment, the processor may be configured to discard any one of the solutions falling outside a predetermined search area by more than a threshold value.

In an aspect of the embodiment, the at least one target detection platform may be configured to generate a track representing movement of the signal emitter, and the processor may be configured to discard any one of the solutions diverging from the track by more than a threshold value. In another aspect of the embodiment, the at least one target detection platform provides an expected position measurement of the signal emitter to match the TDOA/FDOA location calculated with the velocity vector of position measured by the at least one target detection platform such as radar or other suitable means.

In an aspect of the embodiment, the signal may be a radio frequency signal.

In an aspect of the embodiment, the at least one target detection platform may include a radar system.

In an aspect of the embodiment, the at least one target detection platform may include an MTI radar system.

In an aspect of the embodiment, the system may further include at least one data link for exchanging data among the processor, the at least two signal collection platforms and the at least one target detection platform.

BRIEF DESCRIPTION OF THE DRAWINGS

The accompanying drawings, together with the specification, illustrate exemplary embodiments of the present invention, and, together with the description, serve to explain the principles of the present invention.

DETAILED DESCRIPTION OF EXEMPLARY EMBODIMENTS

Figure 1A:
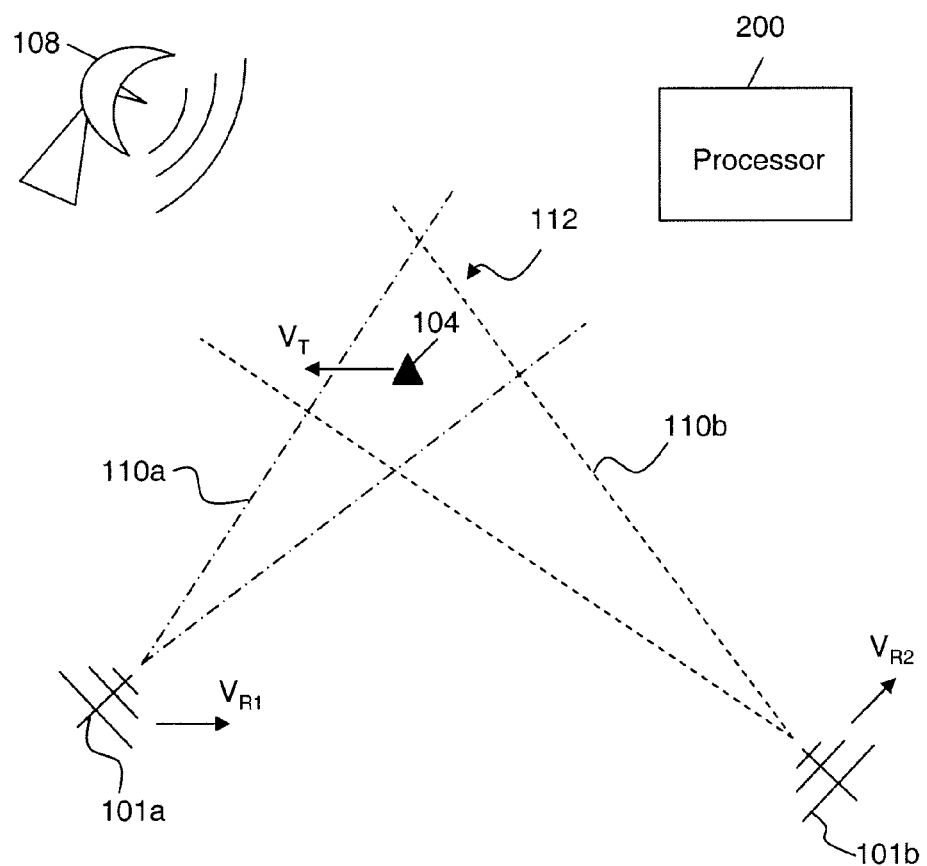
FIGS. 1a and 1b are schematic drawings illustrating a system for determining the geolocation of a signal emitter according to an embodiment of the present invention.

Detailed descriptions will be made below in reference to certain exemplary embodiments according to the present invention. The drawings and descriptions are to be regarded as illustrative in nature and not restrictive.

TDOA/FDOA techniques have been commonly used for determining the geolocation of a signal emitter (e.g., RF signal emitter, microwave signal emitter, etc.). To implement TDOA/FDOA techniques, multiple signal collection platforms (at least two) are required. Known TDOA/FDOA techniques can very reliably identify the geolocation of the signal emitter when the signal emitter is stationary or moving at a very slow speed relative to the signal collection platforms. However, conventional TDOA/FDOA techniques assume a zero target velocity, and thus, when the signal emitter has a substantially nonzero velocity relative to the signal collection platforms, the geolocation of the signal transmitter is not reliably identified because movement of the signal emitter creates large biases in the TDOA/FDOA solutions.

For example, TDOA is a technique for locating an RF or microwave signal emitter. An RF or microwave signal emitted by the signal emitter is measured at two or more separated signal collection platforms (e.g., RF signal receivers). Based on the path length or range difference between the RF or microwave signal emitter and the signal collection platforms, the signal arrives at each of the signal collection platforms at different times. The measured signals received by the two or more observing signal collection platforms are then cross-correlated, and the peak output from the cross-correlation is a measure of the TDOA between the signal collection platforms. Further calculation results in the generation of an isochron, or an imaginary line of constant time difference on which the signal emitter is known to be located. When at least one of the signal collection platforms moves, the isochron correspondingly moves, and the location of the signal emitter is determined to be the intersection of these two lines. However, when the signal emitter itself moves, the lines may not intersect, or the intersection of the lines may move, introducing error into the determined geolocation of the signal emitter.

FDOA is a technique based on the characteristics of the propagation medium and the locations and velocities of the signal emitter and the signal collection platforms. When the signal emitter and at least one signal collection platform have relative motion (i.e., non-zero relative velocity), a signal frequency shift or Doppler shift occurs due to the relative motion. The relative motion can be achieved using airborne observations in an aircraft, for example, as the signal collection platform. To reduce the number of variables in the system of equations needed to be solved, conventional FDOA systems assume that the velocity of the signal emitter is zero. With this assumption, the signal emitter location is then estimated with knowledge of the signal collection platforms' locations and vector velocities, and the observed relative Doppler shifts between pairs of the signal collection platforms' locations. However, if the signal emitter has a nonzero velocity, the movement of the signal emitter causes Doppler shifts of the same order of magnitude as those from the moving signal collection platforms, introducing a bias into the calculation that can result in an erroneous estimation of signal location. However, accounting for the velocity of the signal emitter brings additional variables into the system of equations used to calculate the signal emitter location, making determination of its geolocation difficult or impossible.

Examples of TDOA/FDOA techniques for location a signal emitter are described in U.S. Pat. Nos. 5,570,099 and 5,874,916 and U.S. patent application No. 2008/0186235, and the entire contents of these patents and patent application are herein incorporated by reference.

To address the above described problem caused by a non-stationary signal emitter, exemplary embodiments of the present invention provide a system and method for determining the geolocation of a moving signal emitter by combining TDOA/FDOA techniques with a predetermined tentative velocity and location of the moving signal emitter. For example, the tentative velocity and location of the signal emitter can be detected by radar, sonar, visible light or infrared/hyper spectral images (such as television, or FLIR) and laser/LADAR. However, the present invention is not limited thereto. By combining multiple sensor modalities, TDOA/FDOA accuracy can be improved when the signal emitter is non-stationary.

In an exemplary embodiment, a radar system is employed to detect at least one tentative velocity and at least one tentative location of the signal emitter. The detected tentative velocity of the signal emitter is used as hypotheses in computing TDOA/FDOA solutions to remove errors that would have been introduced by the movement of the signal emitter. However, it would be appreciated by those skilled in the art that the present invention is not limited to radar system and/or TDOA/FDOA techniques. Other suitable methods for detecting/ranging a moving signal emitter and determining the geolocation of the signal emitter may be applied. According to the embodiment, TDOA/FDOA solutions unbiased by the at least one tentative velocity are compared with the at least one tentative location of the signal emitter detected by the radar system. If there is a match, a geolocation of the signal emitter is confirmed, and if there is no match, the above-described process can be repeated until a match is found.

While a radar system is generally not used to detect a signal transmission (e.g., RF signal transmission) from a signal emitter, the radar system can identify the location, range, altitude, direction, and/or speed of a detected object which can be stationary or moving by transmitting and receiving electromagnetic waves to and from the object. Since the radar system generally does not detect the signal emitter by detecting its signal transmission, the radar system generally cannot reliably determine the geolocation of the signal emitter when there are multiple objects detected by the radar system within the proximity of the signal emitter. In such a scenario, any of the detected objects may be a potential signal emitter. Therefore, while the radar system can provide very accurate ranging of a detectable object, the radar system cannot reliably identify the signal emitter when other objects are also detected within the proximity of the signal emitter. However, when the data (e.g., velocity and location) from the radar system are combined with the above-described TDOA/FDOA techniques, signal emitter movement induced errors in TDOA/FDOA solutions can be compensated for.

A moving target indicator (MTI) radar system is a mode of operation of the radar system to discriminate a moving target against relatively stationary clutter. The MTI radar system exploits the fact that the moving target moves with respect to stationary clutter. A common approach of implementing the MTI radar system exploits the Doppler Effect caused by the motions of the moving target. For a sequence of radar pulses, the moving target will be at different distance from the radar system and the phase of the radar pulses returning from the moving target will be different for successive radar pulses, while the radar pulses returning from stationary clutter will arrive at the same frequency shift. An exemplary MTI radar system is described in U.S. Pat. No. 4,217,583, the entire content of this patent application is herein incorporated by reference.

FIG. 1a is a diagram illustrating an exemplary system for determining the geolocation of a signal emitter by combining TDOA/FDOA techniques with radar ranging to locate a moving signal emitter according to an embodiment of the present invention.

Referring to FIG. 1a, the system includes at least two signal collection platforms 101a and 101b (e.g., RF signal receivers) for receiving a signal transmission from a signal emitter 104. The two signal collection platforms 101a and 101b are suitably equipped to perform direction finding (DF) and determine the geolocation of the signal emitter 104 by, for example, TDOA and/or FDOA techniques. For the purpose of illustrating the concept of employing the FDOA technique to determine the geolocation of the signal emitter 104, it is assumed that the signal emitter 104 and at least one of the at least two signal collection platforms 101a and 101b are in relative motion (i.e., non-zero velocity) with respect to each other. For example, the signal emitter 104 and the at least two signal collection platforms 101a and 101b are illustrated as having velocity $V_T$, $V_{R1}$, and $V_{R2}$, respectively, in FIG. 1a. The relative motion between the signal emitter 104 and the at least two signal collection platforms 101a and 101b results in different Doppler shift observations of the signal transmission from the signal emitter 104 at each of the at least two signal collection platforms 101a and 101b. Therefore, when the locations and vector velocities of the signal collection platforms 101a and 101b are known, the geolocation of the signal emitter 104 can be estimated with the observed relative Doppler shifts between the pairs of the signal collection platforms 101a and 101b.

In addition, the system illustrated in FIG. 1a includes at least one target detecting platform 108 (e.g., a radar system) for determining tentative location, range, altitude, direction, and/or velocity of the signal emitter 104. However, one skilled in the art would appreciate that location and velocity detection can be achieved not only via radar based methods, e.g., MTI radar, but can be achieved by any other suitable method that measures velocity and position. Non-limiting examples include sonar, visible light or infrared/hyper spectral images (such as television, or FLIR) and laser/LADAR.

In some embodiments, the at least one target detecting platform 108 may include a moving target indicator (MTI) radar system. An MTI radar system exploits the relative movement of a moving target (e.g., signal emitter 104) with respect to stationary clutter of the surroundings. Since the movement of the signal emitter 104 creates a Doppler effect, for a sequence of radar pulses from the target detection platform 108, the signal emitter 104 will be at different distances from the at least one target detection platform 108, and the phases of the radar returns from the signal emitter 104 will be different for successive radar pulses, while the returns from the stationary clutter will arrive at the same frequency shift. Furthermore, it would be appreciated by those skilled in the art that the at least one target collection platform 108 and one of the at least two signal collection platforms 101a and 101b may be located on the same platform. Therefore, while FIG. 1a illustrates that the target detection platform 108 is separated from the at least two signal collection platforms 101a and 101b, the present invention is not limited thereto.

Figure 2:
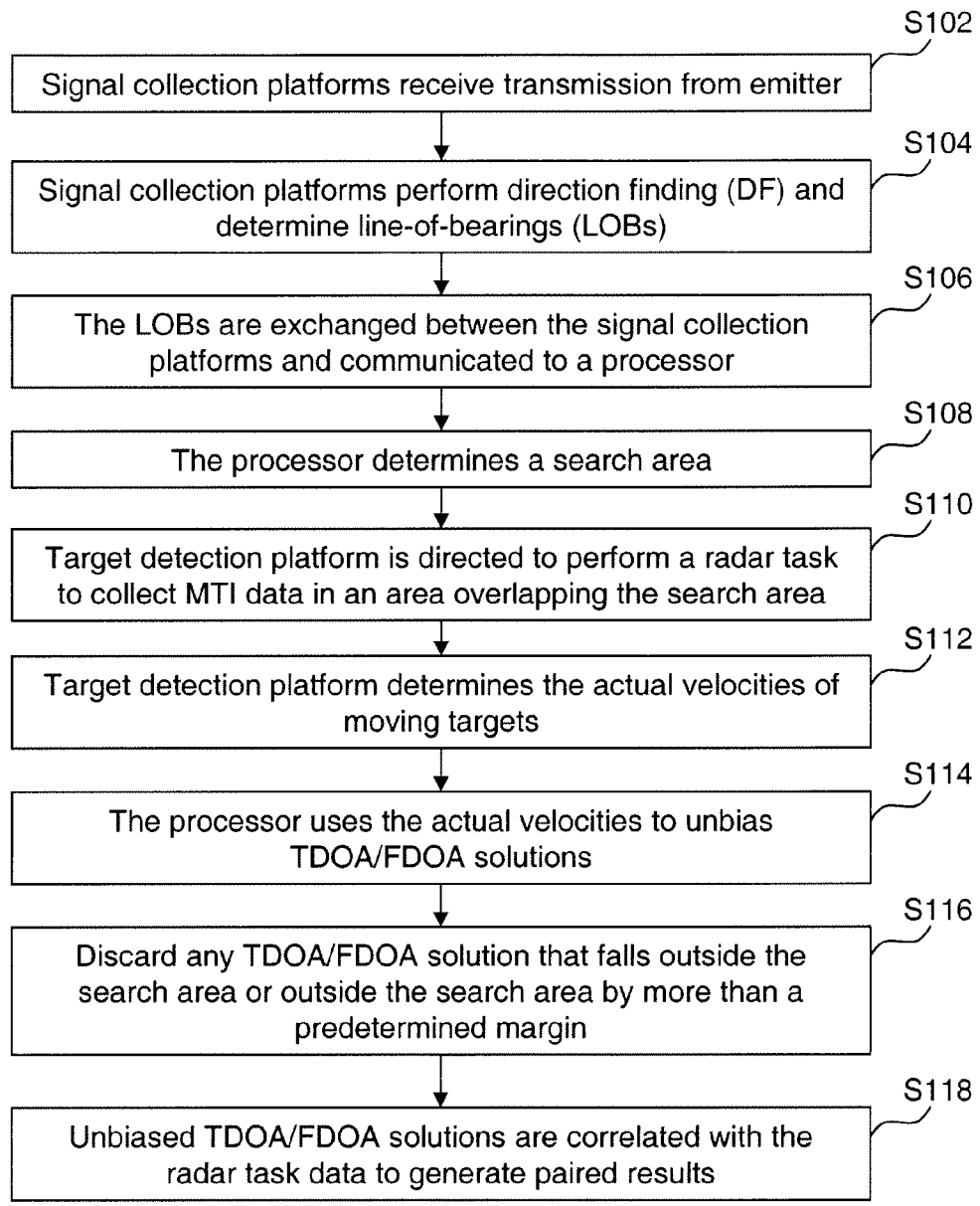
FIG. 2 is a flowchart diagram illustrating a method of operating the system of FIGS. 1a and 1b according to an embodiment of the present invention.

FIG. 2 is a flowchart diagram illustrating a method of operating the system of FIG. 1a according to an embodiment of the present invention.

An exemplary method of operating the system illustrated in FIG. 1a will now be described in detail in reference to FIG. 2. The at least two signal collection platforms 101a and 101b each receive the signal transmission from the signal emitter 104 (S102). Each of the at least two signal collection platforms 101a and 101b performs direction finding (DF) to produce respective line-of-bearings (LOBs) 110a and 110b of the signal emitter 104 (S104). The LOBs 110a and 110b are exchanged between the at least two signal collection platforms 101a and 101b and communicated to a processor 200 by one or more suitable data links (S106), then the processor 200 determines a search area 112 (e.g., a polygon area), in which the signal emitter 104 lies, defined by the intersection of the LOBs 110a and 110b (S108). The location of the search area 112 is communicated to the at least one target detection platform 108 by a suitable data link. In some embodiments, the at least one target detection platform 108, the at least two signal collection platforms 101a and 101b, and the processor 200 communicate to each other by wireless data links. However, the present invention is not limited thereto; on the contrary, other suitable methods of communication may be utilized. Furthermore, while FIG. 1a illustrates the processor 200 as a separate unit, the present invention is not limited thereto, on the contrary, the processor 200 may be a single processor located on the same platform with any one of the at least one target detection platform 108 or the at least two signal collection platforms 101a and 101b. Alternatively, the processor 200 may include multiple units with one or more of the multiple units being included in a corresponding one of the at least one target detection platform 108 and/or the at least two signal collection platforms 101a and 101b.

Figure 1B:
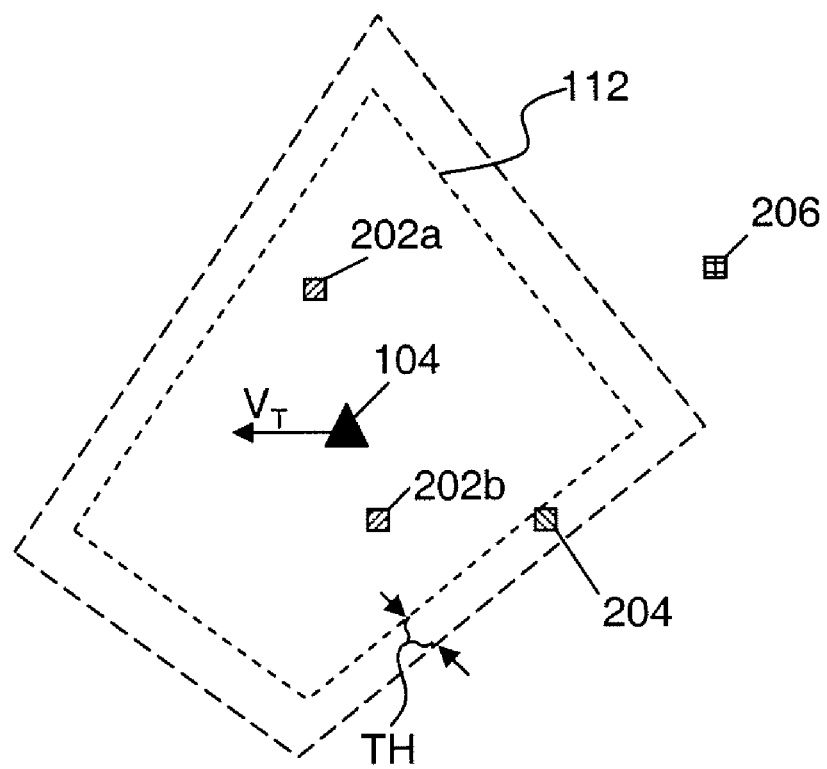

Referring further to FIG. 2, after the search area 112 is determined by the processor 200 and communicated to the at least one target detection platform 108, the at least one target detection platform 108 is directed to perform a radar task to collect MTI data within an area substantially overlapping the search area 112 (S110). FIG. 1b is a schematic drawing illustrating an enlarged search area 112 of FIG. 1a in more detail according to an embodiment of the present invention. Referring to FIG. 1b, the MTI data include moving targets 104, 202a and 202b within the search area 112. The radar task may also detect and include moving targets such as target 204 located on the outside of the search area 112 but within a predetermined threshold distance (TH) from the boundary of the search area 112. Moving targets such as target 206 located on the outside of the search area 112 by more than the threshold distance (TH) are discarded.

The at least one target detection platform 108 determines locations and actual velocities of the moving targets by suitable methods according to the particular configuration of the at least one target detection platform 108 (S112). For example, according to an embodiment of the present invention, the at least one target detection platform includes two radars located on separate platforms for determining the locations and actual velocity of moving targets. According to another embodiment of the present invention, the at least one target detection platform 108 may perform radar based tracking on the detected moving targets to determine their actual velocities and locations.

After the locations and actual velocities of the moving targets are determined, the processor 200 uses the actual velocities to unbias the TDOA/FDOA solutions produced by the signal collection platforms 101a and 101b corresponding to the received signals (S114). Any unbiased TDOA/FDOA solution that falls outside the search area 112 or outside the search area 112 by more than a predetermined margin is discarded (S116). Then, the unbiased TDOA/FDOA solutions are correlated with the radar task data of the at least one target detection platform 108 by suitable methods to generate matched pairs of solutions and target locations (S118). Matched pairs between TDOA/FDOA solutions and radar detected locations of moving targets indicate the likely locations of the moving signal emitter 104. In an exemplary embodiment, a matched pair can be determined after the TDOA/FDOA solution and the radar detected location match each other for a predetermined number of samples (e.g., 2-3 samples).

In other embodiments in which the at least one target detection platform 108 performs radar based tracking on the moving targets, the matching between the TDOA/FDOA solutions and the radar tracks may utilize multiple hypothesis tracker (MHT) logic.

According to the described embodiments of the present invention, an improved system and method of determining the geolocation of a signal emitter is provided by combining multiple sensor modalities. Further, conventional TDOA/FDOA techniques of geolocation of a signal emitter are improved by combining TDOA/FDOA techniques with a predetermined tentative velocity and location of the signal emitter to unbias the error of the TDOA/FDOA solutions caused by the movement of a non-stationary signal emitter. However, one skilled in the art would appreciate that while the exemplary embodiments are described and illustrated using TDOA/FDOA and radar system as exemplary techniques for detecting and locating a non-stationary signal emitter, the present invention is not limited thereto. On the contrary, the present invention may be implemented using other suitable signal emitter locating/detecting techniques.

Application Example 1

The following example illustrates an application of the embodiments of the present invention.

Figure 3:
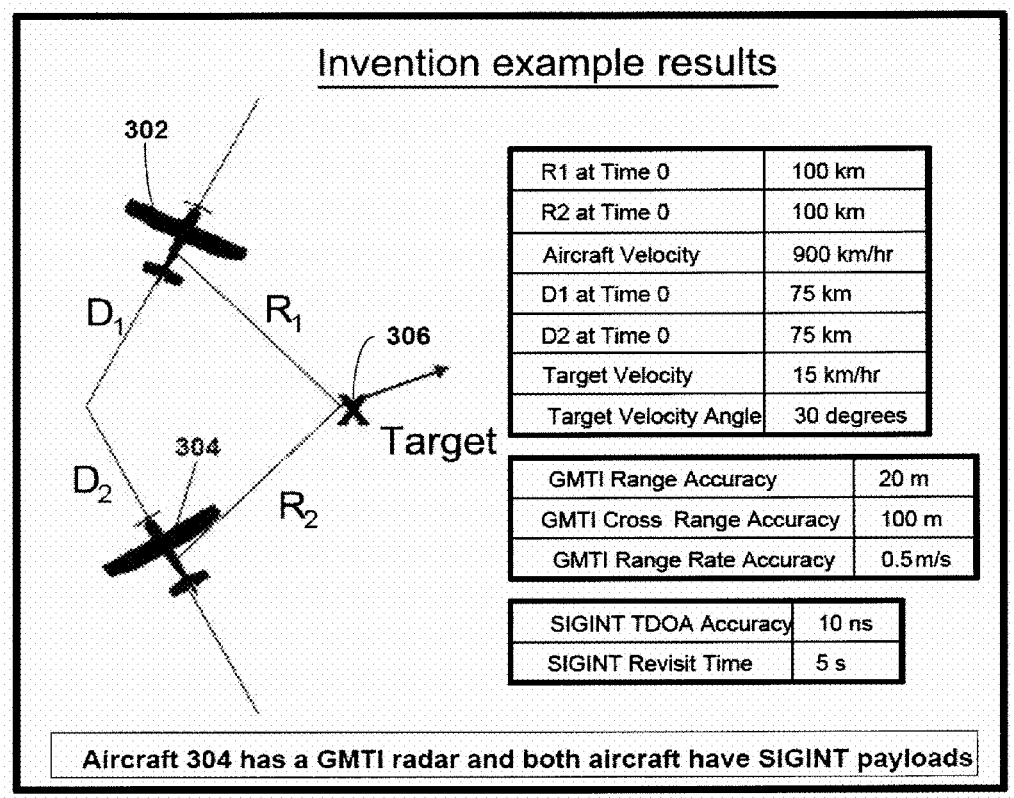
FIG. 3 is a schematic illustration of an exemplary embodiment of the present invention showing simulation results.

Referring to FIG. 3, two aircraft 302 and 304 each have signals intelligence (SIGINT) sensors capable of measuring time of arrival. At an initial time "0," the target 306, which has a velocity of 15 km/hr at a 30 degree angle, is at a range of R1 and R2 from aircraft 302 and 304, respectively. At this time, each aircraft 302 and 304 has a speed of 900 km/hr. One of the aircraft, for example, aircraft 304, is equipped with a GMTI radar, and makes a single measurement of the target 306 with a range accuracy of 20 m, a cross-range accuracy of 100 m, and a range rate accuracy of 0.5 m/s. Further, the aircraft 302 and 304 utilize their SIGINT sensors to measure the TDOA with an accuracy of 10 ns, and a revisit time of 5 s. Observable data from two aircraft are combined in accordance an exemplary embodiment of the invention. That is, the GMTI measurement from aircraft 304 is combined with the TDOA data to produce an improved estimate of target motion parameters, as illustrated below in TABLE 1.

TABLE 1

| Accuracy after 120 seconds | Single GMTI | TDOA | Combined GMTI & TDOA |
| --- | --- | --- | --- |
| Median Target position accuracy | 68 m | 17 km | 15 m |
| Median Target velocity accuracy | N/A | 180 km/hr | 0.9 km/hr |

As seen in TABLE 1, a single GMTI observable is unable to resolve the cross range velocity. Further, TDOA observables alone produce relatively large errors when the target is in motion. If the target were stationary, the position accuracy would be roughly 4 meters. Combining the two modalities in accordance with an exemplary embodiment of the invention produces significant improvement. In another embodiment, even greater improvement would be seen by combining other observables such as FDOA and line of bearing along with multiple GMTI detects.

Application Example 2

Assuming a scenario where it is desired to rapidly determine the location of a mobile terminal (e.g. a mobile phone) of interest. When the mobile terminal is operating, multiple airborne signal collection platforms (hereinafter "platforms") receive an RF transmission emitted from the mobile terminal. Then each of the signal collection platforms performs DF LOB which is exchanged between the platforms via air-to-air links. The intersection of the DF LOBs forms a polygon in which the mobile terminal lies. Subsequent DF LOBs may be processed the same way forming a sequence of polygons. The outline of the polygons and signal information of the RF transmission are displayed to the operator of the system through a suitable display. Further, the system automatically looks for any existing track within the polygons. For the convenience of description, the following description assumes only one polygon and no track being detected.

Each platform that has visibility to the polygon creates a high priority radar task to collect MTI data within the polygon. In some cases, the polygon may be less than half a mile in diameter. Each platform may collect the MTI data by interleaving radar beams to maintain other tasks. Each platform uses the various radial velocities from its own MTI data, plus zero velocity, as possible velocities for unbiasing the TDOA/FDOA solutions. Then, the platforms exchange I&Q data and correction factors to account for the various velocities and create a set of TDOA/FDOA solutions. Furthermore, solutions lying outside the polygon by a predetermined threshold distance are discarded. Solutions within the threshold and within the polygon are kept for later processing.

Radar based tracking forms tracks on the moving targets within the polygon. Subsequently, suitable association logic may be used to attempt to pair the TDOA/FDOA solutions with the tracks within the polygon. The association logic forms one or more best pairs, and will over time prune the pairs to one best pair if the signal transmission remains on the air, or reappears. Further, new high priority MTI tasks may be created to provide, for example, 500 ms revisits in MTI mode to each paired track to ensure track continuity. In addition, the logic for the radar tasking may account for shadowing and squint and so will pass the task from one platform to another as required to maintain coverage of the tracks.

Meanwhile, an automatic process may determine which platform has the best earth observation (EO) visibility to the detected targets and will point the EO sensor (if installed) at the successfully paired targets, as well as the location of the zero velocity TDOA/FDOA solution. Further, a radar task may be created to collect a high resolution synthetic-aperture radar (SAR) image of the polygon. Accordingly, if the signal emitter is not moving, a radar image may be captured.

While the present invention has been described in connection with certain exemplary embodiments, it is to be understood that the present invention is not limited to the disclosed embodiments, but, on the contrary, is intended to cover various modifications and equivalent arrangements included within the spirit and scope of the appended claims, and equivalents thereof.

What is claimed is:

1. A system for locating a signal emitter, the system comprising:
   at least two signal collection platforms spaced apart from each other for passively receiving a signal generated from a signal emitter and forming line-of-bearings of the signal emitter;
   at least one target detection platform for detecting a tentative location and a tentative velocity of the signal emitter; and
   a processor for determining a geolocation of the signal emitter by utilizing the signal received by the at least two signal collection platforms, the tentative location and the tentative velocity of the signal emitter.

2. The system for locating a signal emitter of claim 1, wherein the at least two signal collection platforms are configured to have a non-zero relative velocity.

3. The system for locating a signal emitter of claim 1, wherein the processor is configured to define a search area corresponding to the line-of-bearings, and the at least one target detection platform is configured to search for the signal emitter in an area substantially overlapping the search area.

4. The system for locating a signal emitter of claim 1, wherein the at least two signal collection platforms are configured to provide signal data to the processor for performing a TDOA and/or an FDOA technique to generate at least one solution for the geolocation of the signal emitter.

5. The system for locating a signal emitter of claim 4, wherein the processor is configured to utilize the tentative velocity of the signal emitter to reduce a bias in the at least one solution for the geolocation of the signal emitter.

6. The system for locating a signal emitter of claim 5, wherein the processor is configured to discard any solution of the at least one solution located outside a predetermined search area by more than a threshold distance.

7. The system for locating a signal emitter of claim 5,
   wherein the at least one target detection platform is configured to generate a track representing movement of the signal emitter, and
   the processor is configured to discard any solution of the at least one solution diverging from the track by more than a threshold distance.

8. The system for locating a signal emitter of claim 1, wherein the signal is a radio frequency signal.

9. The system for locating a signal emitter of claim 1, wherein the at least one target detection platform comprises a radar system.

10. The system for locating a signal emitter of claim 1, wherein the at least one target detection platform comprises an MTI radar system.

11. The system for locating a signal emitter of claim 1, further comprising at least one data link for exchanging data among the processor, the at least two signal collection platforms and the at least one target detection platform.

\* \* \* \* \*